(12) United States Patent
Vishnia et al.

(10) Patent No.: US 10,218,760 B2
(45) Date of Patent: Feb. 26, 2019

(54) DYNAMIC SUMMARY GENERATION FOR REAL-TIME SWITCHABLE VIDEOS

(71) Applicant: JBF Interlude 2009 LTD, Tel Aviv-Yafo (IL)

(72) Inventors: Opher Vishnia, Ramat Gan (IL); Sam Barlow, Brooklyn, NY (US); Jonathan Bloch, Brooklyn, NY (US); Barak Feldman, Tenafly, NJ (US); Tal Zubalsky, Brooklyn, NY (US); Yuval Hofshy, Kfar Saba (IL)

(73) Assignee: JBF Interlude 2009 LTD, Tel Aviv-Jaffa (IL)

( * ) Notice: Subject to any disclaimer, the term of this patent is extended or adjusted under 35 U.S.C. 154(b) by 146 days.

(21) Appl. No.: 15/189,931

(22) Filed: Jun. 22, 2016

(65) Prior Publication Data

US 2017/0374120 A1     Dec. 28, 2017

(51) Int. Cl.
G06F 15/16     (2006.01)
H04L 29/06     (2006.01)

(52) U.S. Cl.
CPC ........ H04L 65/601 (2013.01); H04L 65/4092 (2013.01); H04L 65/608 (2013.01)

(58) Field of Classification Search
USPC ........................................................ 709/231
See application file for complete search history.

(56) References Cited

U.S. PATENT DOCUMENTS

| | | |
|---|---|---|
| 4,569,026 A | 2/1986 | Best |
| 5,161,034 A | 11/1992 | Klappert |
| 5,568,602 A | 10/1996 | Callahan et al. |
| 5,607,356 A | 3/1997 | Schwartz |
| 5,636,036 A | 6/1997 | Ashbey |
| 5,676,551 A | 10/1997 | Knight et al. |
| 5,734,862 A | 3/1998 | Kulas |
| 5,737,527 A | 4/1998 | Shiels et al. |
| 5,745,738 A | 4/1998 | Ricard |
| 5,754,770 A | 5/1998 | Shiels et al. |

(Continued)

FOREIGN PATENT DOCUMENTS

| | | |
|---|---|---|
| CA | 2639491 A1 | 3/2010 |
| DE | 004038801 A1 | 6/1992 |

(Continued)

OTHER PUBLICATIONS

An ffmpeg and SDL Tutorial, "Tutorial 05: Synching Video," Retrieved from Internet on Mar. 15, 2013: <http://dranger.com/ffmpeg/tutorial05.html> (4 pages).

(Continued)

*Primary Examiner* — Hee Soo Kim
(74) *Attorney, Agent, or Firm* — Goodwin Procter LLP

(57) ABSTRACT

In viewing a media presentation having multiple streams or tracks running in parallel and synchronized to a common playback timeline, a user experiencing one of the streams will miss interesting events and other content occurring in other streams. Accordingly, upon receiving an instruction to switch from a first stream to a second stream, a summary of the second stream is dynamically generated based on content that the user missed while watching the first stream. The summary is presented to the user prior to transitioning to presentation of the second stream.

20 Claims, 10 Drawing Sheets

(56) References Cited

U.S. PATENT DOCUMENTS

| | | | |
|---|---|---|---|
| 5,818,435 A | 10/1998 | Kozuka et al. | |
| 5,848,934 A | 12/1998 | Shiels et al. | |
| 5,887,110 A | 3/1999 | Sakamoto et al. | |
| 5,894,320 A | 4/1999 | Vancelette | |
| 6,067,400 A | 5/2000 | Saeki et al. | |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,240,555 B1 | 5/2001 | Shoff et al. | |
| 6,298,482 B1 | 10/2001 | Seidman et al. | |
| 6,657,906 B2 | 12/2003 | Martin | |
| 6,698,020 B1 | 2/2004 | Zigmond et al. | |
| 6,728,477 B1 | 4/2004 | Watkins | |
| 6,801,947 B1 | 10/2004 | Li | |
| 7,155,676 B2 | 12/2006 | Land et al. | |
| 7,231,132 B1 | 6/2007 | Davenport | |
| 7,310,784 B1 | 12/2007 | Gottlieb et al. | |
| 7,379,653 B2 | 5/2008 | Yap et al. | |
| 7,444,069 B1 | 10/2008 | Bernsley | |
| 7,627,605 B1 | 12/2009 | Lamere et al. | |
| 7,669,128 B2 | 2/2010 | Bailey et al. | |
| 7,694,320 B1 | 4/2010 | Yeo et al. | |
| 7,779,438 B2 | 8/2010 | Davies | |
| 7,787,973 B2 | 8/2010 | Lambert | |
| 7,917,505 B2 | 3/2011 | van Gent et al. | |
| 8,024,762 B2 | 9/2011 | Britt | |
| 8,065,710 B2 | 11/2011 | Malik | |
| 8,151,139 B1 | 4/2012 | Gordon | |
| 8,176,425 B2 | 5/2012 | Wallace et al. | |
| 8,190,001 B2 | 5/2012 | Bernsley | |
| 8,276,058 B2 | 9/2012 | Gottlieb et al. | |
| 8,281,355 B1 | 10/2012 | Weaver et al. | |
| 8,600,220 B2 | 12/2013 | Bloch et al. | |
| 8,612,517 B1 | 12/2013 | Yadid et al. | |
| 8,650,489 B1 | 2/2014 | Baum et al. | |
| 8,826,337 B2 | 9/2014 | Issa et al. | |
| 8,860,882 B2 | 10/2014 | Bloch et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,082,092 B1 | 7/2015 | Henry | |
| 9,094,718 B2 | 7/2015 | Barton et al. | |
| 9,190,110 B2 | 11/2015 | Bloch | |
| 9,257,148 B2 | 2/2016 | Bloch et al. | |
| 9,268,774 B2 | 2/2016 | Kim et al. | |
| 9,271,015 B2 | 2/2016 | Bloch et al. | |
| 9,390,099 B1 | 7/2016 | Wang et al. | |
| 9,465,435 B1 | 10/2016 | Zhang et al. | |
| 9,520,155 B2 | 12/2016 | Bloch et al. | |
| 9,530,454 B2 | 12/2016 | Bloch et al. | |
| 9,607,655 B2 | 3/2017 | Bloch et al. | |
| 9,641,898 B2 | 5/2017 | Bloch et al. | |
| 9,653,115 B2 | 5/2017 | Bloch et al. | |
| 9,653,116 B2 | 5/2017 | Paulraj et al. | |
| 9,672,868 B2 | 6/2017 | Bloch et al. | |
| 9,792,026 B2 | 10/2017 | Bloch et al. | |
| 9,792,957 B2 | 10/2017 | Bloch et al. | |
| 9,826,285 B1* | 11/2017 | Mishra | H04N 21/8549 |
| 2002/0086724 A1 | 7/2002 | Miyaki et al. | |
| 2002/0091455 A1 | 7/2002 | Williams | |
| 2002/0105535 A1 | 8/2002 | Wallace et al. | |
| 2002/0106191 A1 | 8/2002 | Betz et al. | |
| 2002/0120456 A1 | 8/2002 | Berg et al. | |
| 2002/0124250 A1 | 9/2002 | Proehl et al. | |
| 2002/0129374 A1* | 9/2002 | Freeman | H04H 20/12 725/91 |
| 2002/0140719 A1 | 10/2002 | Amir et al. | |
| 2002/0144262 A1 | 10/2002 | Plotnick et al. | |
| 2002/0177914 A1 | 11/2002 | Chase | |
| 2002/0194595 A1 | 12/2002 | Miller et al. | |
| 2003/0007560 A1 | 1/2003 | Mayhew et al. | |
| 2003/0148806 A1 | 8/2003 | Weiss | |
| 2003/0159566 A1 | 8/2003 | Sater et al. | |
| 2003/0183064 A1 | 10/2003 | Eugene et al. | |
| 2003/0184598 A1 | 10/2003 | Graham | |
| 2003/0221541 A1 | 12/2003 | Platt | |
| 2004/0019905 A1 | 1/2004 | Fellenstein et al. | |
| 2004/0034711 A1 | 2/2004 | Hughes | |
| 2004/0091848 A1 | 5/2004 | Nemitz | |
| 2004/0125124 A1 | 7/2004 | Kim et al. | |
| 2004/0128317 A1 | 7/2004 | Sull et al. | |
| 2004/0138948 A1 | 7/2004 | Loomis | |
| 2004/0172476 A1 | 9/2004 | Chapweske | |
| 2004/0194128 A1 | 9/2004 | McIntyre et al. | |
| 2004/0194131 A1 | 9/2004 | Ellis et al. | |
| 2005/0019015 A1 | 1/2005 | Ackley et al. | |
| 2005/0055377 A1 | 3/2005 | Dorey et al. | |
| 2005/0091597 A1 | 4/2005 | Ackley | |
| 2005/0102707 A1 | 5/2005 | Schnitman | |
| 2005/0107159 A1 | 5/2005 | Sato | |
| 2005/0166224 A1 | 7/2005 | Ficco | |
| 2005/0198661 A1 | 9/2005 | Collins et al. | |
| 2005/0210145 A1 | 9/2005 | Kim et al. | |
| 2005/0251820 A1 | 11/2005 | Stefanik et al. | |
| 2006/0002895 A1 | 1/2006 | McDonnell et al. | |
| 2006/0024034 A1 | 2/2006 | Filo et al. | |
| 2006/0028951 A1 | 2/2006 | Tozun et al. | |
| 2006/0064733 A1 | 3/2006 | Norton et al. | |
| 2006/0150072 A1 | 7/2006 | Salvucci | |
| 2006/0155400 A1 | 7/2006 | Loomis | |
| 2006/0200842 A1 | 9/2006 | Chapman et al. | |
| 2006/0222322 A1 | 10/2006 | Levitan | |
| 2006/0224260 A1 | 10/2006 | Hicken et al. | |
| 2007/0003149 A1 | 1/2007 | Nagumo et al. | |
| 2007/0024706 A1 | 2/2007 | Brannon et al. | |
| 2007/0033633 A1 | 2/2007 | Andrews et al. | |
| 2007/0055989 A1* | 3/2007 | Shanks | A63F 13/12 725/37 |
| 2007/0099684 A1 | 5/2007 | Butterworth | |
| 2007/0101369 A1* | 5/2007 | Dolph | H04N 7/17318 725/46 |
| 2007/0118801 A1 | 5/2007 | Harshbarger et al. | |
| 2007/0157261 A1 | 7/2007 | Steelberg et al. | |
| 2007/0162395 A1 | 7/2007 | Ben-Yaacov et al. | |
| 2007/0226761 A1 | 9/2007 | Zalewski et al. | |
| 2007/0239754 A1 | 10/2007 | Schnitman | |
| 2007/0253677 A1 | 11/2007 | Wang | |
| 2007/0253688 A1 | 11/2007 | Koennecke | |
| 2007/0263722 A1 | 11/2007 | Fukuzawa | |
| 2008/0019445 A1 | 1/2008 | Aono et al. | |
| 2008/0021874 A1 | 1/2008 | Dahl et al. | |
| 2008/0022320 A1 | 1/2008 | Ver Steeg | |
| 2008/0031595 A1 | 2/2008 | Cho | |
| 2008/0086456 A1 | 4/2008 | Rasanen et al. | |
| 2008/0086754 A1 | 4/2008 | Chen et al. | |
| 2008/0091721 A1 | 4/2008 | Harboe et al. | |
| 2008/0092159 A1 | 4/2008 | Dmitriev et al. | |
| 2008/0148152 A1 | 6/2008 | Blinnikka et al. | |
| 2008/0170687 A1 | 7/2008 | Moors et al. | |
| 2008/0177893 A1 | 7/2008 | Bowra et al. | |
| 2008/0178232 A1 | 7/2008 | Velusamy | |
| 2008/0276157 A1 | 11/2008 | Kustka et al. | |
| 2008/0300967 A1 | 12/2008 | Buckley et al. | |
| 2008/0301750 A1 | 12/2008 | Silfvast et al. | |
| 2008/0314232 A1 | 12/2008 | Hansson et al. | |
| 2009/0022015 A1 | 1/2009 | Harrison | |
| 2009/0022165 A1 | 1/2009 | Candelore et al. | |
| 2009/0024923 A1 | 1/2009 | Hartwig et al. | |
| 2009/0055880 A1 | 2/2009 | Batteram et al. | |
| 2009/0063681 A1 | 3/2009 | Ramakrishnan et al. | |
| 2009/0077137 A1* | 3/2009 | Weda | G06F 17/30843 |
| 2009/0116817 A1 | 5/2009 | Kim et al. | |
| 2009/0191971 A1 | 7/2009 | Avent | |
| 2009/0195652 A1 | 8/2009 | Gal | |
| 2009/0199697 A1 | 8/2009 | Lehtiniemi et al. | |
| 2009/0228572 A1 | 9/2009 | Wall et al. | |
| 2009/0254827 A1 | 10/2009 | Gonze et al. | |
| 2009/0258708 A1 | 10/2009 | Figueroa | |
| 2009/0265746 A1 | 10/2009 | Halen et al. | |
| 2009/0297118 A1 | 12/2009 | Fink et al. | |
| 2009/0320075 A1 | 12/2009 | Marko | |
| 2010/0017820 A1 | 1/2010 | Thevathasan et al. | |
| 2010/0042496 A1 | 2/2010 | Wang et al. | |

(56) References Cited

U.S. PATENT DOCUMENTS

| | | |
|---|---|---|
| 2010/0077290 A1 | 3/2010 | Pueyo |
| 2010/0088726 A1 | 4/2010 | Curtis et al. |
| 2010/0146145 A1 | 6/2010 | Tippin et al. |
| 2010/0153512 A1 | 6/2010 | Balassanian et al. |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0186032 A1 | 7/2010 | Pradeep et al. |
| 2010/0186579 A1 | 7/2010 | Schnitman |
| 2010/0210351 A1 | 8/2010 | Berman |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0191684 A1 | 8/2011 | Greenberg |
| 2011/0191801 A1 | 8/2011 | Vytheeswaran |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2012/0004960 A1 | 1/2012 | Ma et al. |
| 2012/0005287 A1 | 1/2012 | Gadel et al. |
| 2012/0017141 A1 | 1/2012 | Eelen et al. |
| 2012/0062576 A1 | 3/2012 | Rosenthal et al. |
| 2012/0081389 A1 | 4/2012 | Dilts |
| 2012/0089911 A1 | 4/2012 | Hosking et al. |
| 2012/0094768 A1 | 4/2012 | McCaddon et al. |
| 2012/0110618 A1 | 5/2012 | Kilar et al. |
| 2012/0110620 A1 | 5/2012 | Kilar et al. |
| 2012/0134646 A1 | 5/2012 | Alexander |
| 2012/0147954 A1 | 6/2012 | Kasai et al. |
| 2012/0179970 A1 | 7/2012 | Hayes |
| 2012/0198412 A1 | 8/2012 | Creighton et al. |
| 2012/0263263 A1 | 10/2012 | Olsen et al. |
| 2012/0308206 A1 | 12/2012 | Kulas |
| 2013/0028573 A1 | 1/2013 | Hoofien et al. |
| 2013/0031582 A1 | 1/2013 | Tinsman et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129308 A1 | 5/2013 | Karn et al. |
| 2013/0177294 A1 | 7/2013 | Kennberg |
| 2013/0188923 A1 | 7/2013 | Hartley et al. |
| 2013/0204710 A1 | 8/2013 | Boland et al. |
| 2013/0219425 A1 | 8/2013 | Swartz |
| 2013/0254292 A1 | 9/2013 | Bradley |
| 2013/0259442 A1 | 10/2013 | Bloch et al. |
| 2013/0282917 A1 | 10/2013 | Reznik et al. |
| 2013/0308926 A1 | 11/2013 | Jang et al. |
| 2013/0328888 A1 | 12/2013 | Beaver et al. |
| 2014/0019865 A1 | 1/2014 | Shah |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0078397 A1 | 3/2014 | Bloch et al. |
| 2014/0082666 A1 | 3/2014 | Bloch et al. |
| 2014/0094313 A1 | 4/2014 | Watson et al. |
| 2014/0101550 A1 | 4/2014 | Zises |
| 2014/0126877 A1 | 5/2014 | Crawford et al. |
| 2014/0129618 A1 | 5/2014 | Panje et al. |
| 2014/0152564 A1 | 6/2014 | Gulezian et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0282013 A1 | 9/2014 | Amijee |
| 2014/0282642 A1 | 9/2014 | Needham et al. |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0046946 A1 | 2/2015 | Hassell et al. |
| 2015/0058342 A1 | 2/2015 | Kim et al. |
| 2015/0067723 A1 | 3/2015 | Bloch et al. |
| 2015/0104155 A1 | 4/2015 | Bloch et al. |
| 2015/0179224 A1 | 6/2015 | Bloch et al. |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0258454 A1 | 9/2015 | King et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0331942 A1 | 11/2015 | Tan |
| 2016/0062540 A1 | 3/2016 | Yang et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0277779 A1 | 9/2016 | Zhang et al. |
| 2016/0303608 A1 | 10/2016 | Jossick |
| 2017/0062012 A1 | 3/2017 | Bloch et al. |
| 2017/0142486 A1 | 5/2017 | Masuda |
| 2017/0178409 A1 | 6/2017 | Bloch et al. |
| 2017/0178601 A1 | 6/2017 | Bloch et al. |
| 2017/0289220 A1 | 10/2017 | Bloch et al. |
| 2017/0295410 A1 | 10/2017 | Bloch et al. |

FOREIGN PATENT DOCUMENTS

| | | |
|---|---|---|
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2008005288 A | 1/2008 |
| KR | 2004/0005068 A | 1/2004 |
| KR | 2010/0037413 A | 4/2010 |
| WO | WO-1996/013810 A1 | 5/1996 |
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |

(56) References Cited

FOREIGN PATENT DOCUMENTS

| WO | WO-2008/052009 A2 | 5/2008 |
| WO | WO-2008/057444 A2 | 5/2008 |
| WO | WO-2009/137919 A1 | 11/2009 |

OTHER PUBLICATIONS

Archos Gen 5 English User Manual Version 3.0, Jul. 26, 2007, p. 1-81.
Bartlett, "iTunes 11: How to Queue Next Song," *Technipages*, Oct. 6, 2008, pp. 1-8, Retrieved from the Internet on Dec. 26, 2013, http://www.technipages.com/itunes-queue-next-song.html.
International Search Report and Written Opinion for International Patent Application PCT/IB2013/001000 dated Jul. 31, 2013 (11 pages).
International Search Report for International Application PCT/IL2010/000362 dated Aug. 25, 2010 (6 pages).
International Search Report for International Patent Application PCT/IL2012/000080 dated Aug. 9, 2012 (4 pages).
International Search Report for International Patent Application PCT/IL2012/000081 dated Jun. 28, 2012 (4 pages).
Labs.byHook: "Ogg Vorbis Encoder for Flash: Alchemy Series Part 1," Retrieved from Internet on on Dec. 17, 2012: URL:http://labs.byhook.com/2011/02/15/ogg-vorbis-encoder-for-flash-alchem-y-series-part-1/, 2011, 6 pages.
Miller, Gregor et al., "MiniDiver: A Novel Mobile Media Playback Interface for Rich Video Content on an iPhoneTM", Entertainment Computing A ICEC 2009, Sep. 3, 2009, pp. 98-109.
Sodagar, I., "The MPEG-DASH Standard for Multimedia Streaming Over the Internet", IEEE Multimedia, IEEE Service Center, New York, NY US, (2011) 18(4): 62-67.
Supplemental European Search Report for EP13184145 dated Jan. 30, 2014 (5 pages).
Supplemental European Search Report for EP10774637.2 (PCT/IL2010/000362) dated Jun. 28, 2012 (6 pages).
Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).

* cited by examiner

DYNAMIC SUMMARY GENERATION FOR REAL-TIME SWITCHABLE VIDEOS

FIELD OF THE INVENTION

The present disclosure relates generally to media presentations and, more particularly, to systems and methods for dynamically generating summarized versions of video content missed by a user while the user is viewing one or more different video streams.

BACKGROUND

Streaming media presentations, such as online videos, often include separate audio and video streams, or tracks. Some of these media presentations also include multiple video and/or audio streams that are played in parallel, so that a user can switch among the streams and continue playback of a new stream at the same point in time where he or she left off in the previous stream. However, if the user is only viewing one stream while multiple streams are playing in parallel, he will not see or hear the content in the other streams unless he watches every stream separately. The user must then spend unnecessary time and effort in order to feel that he has experienced all available content.

SUMMARY

Systems and methods for dynamically generating summaries of media content are disclosed. In one aspect, a plurality of video streams that are synchronized to a common playback timeline are simultaneously received at, e.g., a video player application. The video streams can include content related to each other, such as a common storyline. At some point during the presentation of one of the video streams to the user, an instruction to switch to a second stream is received. Prior to switching to the second stream, a video summary of the second video stream is generated and presented to the user. The video summary is generated based on content in the second video stream that the user missed while watching the first video stream.

The video summary can be presented to the user directly after presentation of the first stream is stopped, and directly before presentation of the second stream begins. The video summary can also include a summary of content that the user will miss in the second stream while watching the video summary. The video summary can generally include content not previously viewed by the user.

In some implementations, the video summary includes video content from the second video stream presented at an increased playback speed. In other implementations, the video summary includes a selection of still images of video content in the second video stream. In further implementations, the video summary includes content from the second video stream previously designated as important or interesting.

In one implementation, each video stream is composed of multiple segments, each having an associated segment summary video and segment idle video. When generating the video summary, the segment summary videos associated with missed content segments in the second stream can be included in the video summary. Where padding is needed, one or more idle videos associated with a missed segment can be included in the summary as well.

In yet another implementation, the video summary is switched away from while it is being presented. If and when the user switches back to the second stream, a newly generated summary can include a summary of content corresponding to the portion of the previous video summary that was not viewed by the user.

In one implementation, an indicator can be presented that informs the user when an interesting event is occurring or has occurred on a video stream not currently being viewed by the user.

Other aspects of the inventions include corresponding systems and computer-readable media. The various aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein are various implementations of methods and supporting systems for dynamically generating summaries of content in media presentations. The techniques described herein can be implemented in any suitable hardware or software. If implemented as software, the processes can execute on a system capable of running one or more custom operating systems or commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented on a general purpose computing device in the form of a computer including a processing unit, a system memory, and a system bus that couples various system components including the system memory to the processing unit.

Figure 1:
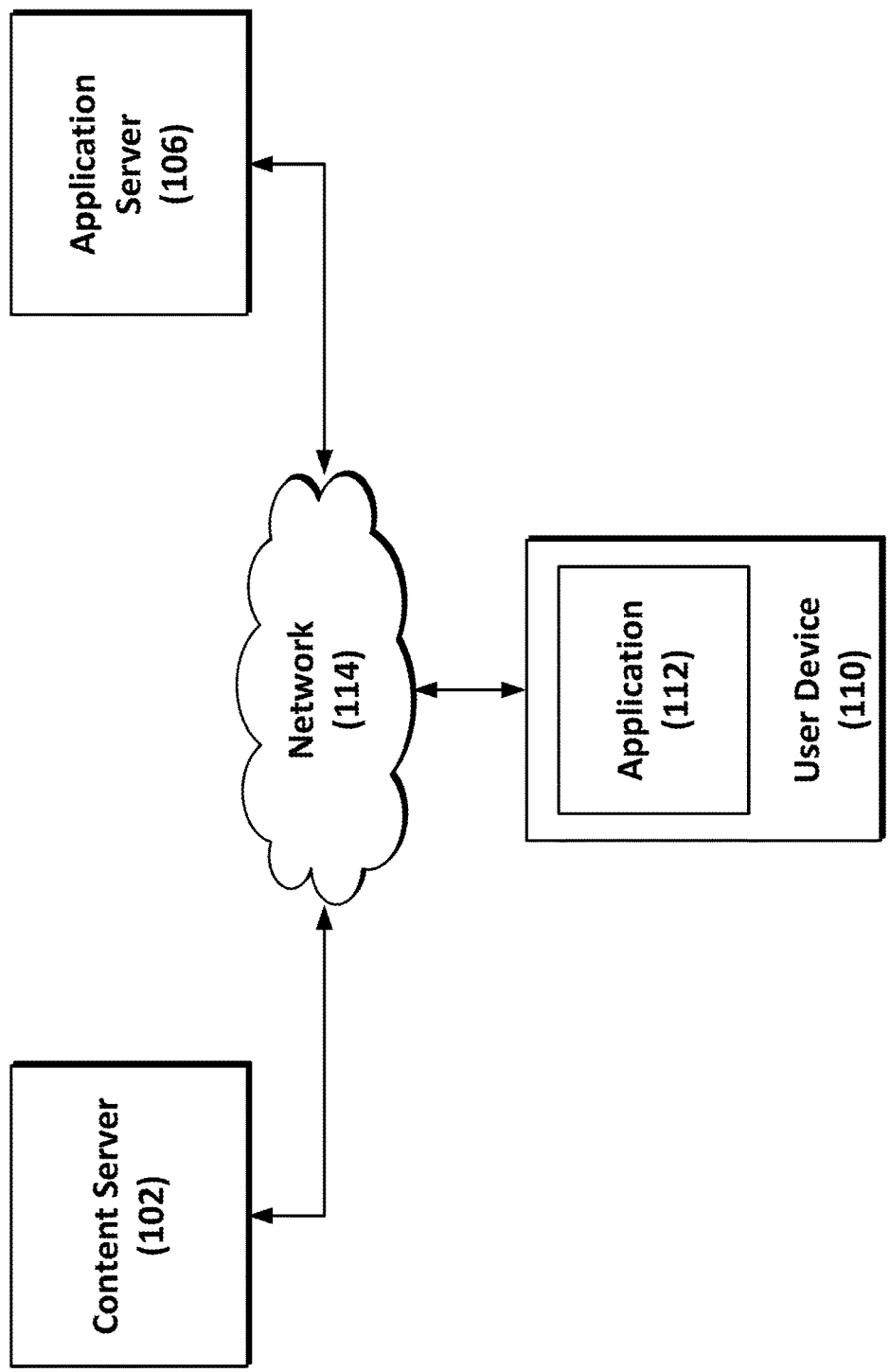
FIG. 1 depicts a high-level system architecture according to an implementation.

FIG. 1 depicts an example system for content summary generation according to an implementation. A media presentation having multiple video and/or audio streams can be presented to a user on a user device 110 having an application 112 capable of playing and/or editing the content. The user device 110 can be, for example, a smartphone, tablet, laptop, palmtop, wireless telephone, television, gaming device, virtual reality headset, music player, mobile telephone, information appliance, workstation, a smart or dumb terminal, network computer, personal digital assistant, wireless device, minicomputer, mainframe computer, or other computing device, that is operated as a general purpose computer or a special purpose hardware device that can execute the functionality described herein. The user device 110 can have output functionality (e.g., display monitor, touchscreen, image projector, etc.) and input functionality (e.g., touchscreen, keyboard, mouse, remote control, etc.).

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

The application 112 can be a video player and/or editor that is implemented as a native application, web application, or other form of software. In some implementations, the application 112 is in the form of a web page, widget, and/or Java, JavaScript, .Net, Silverlight, Flash, and/or other applet or plug-in that is downloaded to the user device 110 and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology can also be employed.

Media content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

The media presentations referred to herein can be structured in various forms. For example, a particular media presentation can be an online streaming video having one video stream and one audio stream. In other implementations, a media presentation includes multiple tracks or streams that a user can switch among in real-time or near real-time. For example, a media presentation can be structured using parallel audio and/or video tracks as described in U.S. patent application Ser. No. 14/534,626, filed on Nov. 6, 2014, and entitled "Systems and Methods for Parallel Track Transitions," the entirety of which is incorporated by reference herein. For example, a playing video file or stream can have one or more parallel tracks that can be switched among in real-time automatically and/or based on user interactions. In some implementations, such switches are made seamlessly and substantially instantaneously, such that the audio and/or video of the playing content can continue without any perceptible delays, gaps, or buffering. In further implementations, switches among tracks maintain temporal continuity; that is, the tracks can be synchronized to a common timeline so that there is continuity in audio and/or video content when switching from one track to another (e.g., the same song is played using different instruments on different audio tracks; same storyline performed by different characters on different video tracks, and the like).

To facilitate near-instantaneous switching among parallel tracks, multiple media tracks (e.g., video streams) can be downloaded simultaneously to user device 110. Upon selecting a streaming video to play, an upcoming portion of the video stream is typically buffered by a video player prior to commencing playing the video, and the video player can continue buffering as the video is playing. Accordingly, in one implementation, if an upcoming segment of a video presentation (including the beginning of the presentation) includes two or more parallel tracks, the application 112 (e.g., a video player) can initiate download of the upcoming parallel tracks substantially simultaneously. The application 112 can then simultaneously receive and/or retrieve video data portions of each track. The receipt and/or retrieval of upcoming video portions of each track can be performed prior to the playing of any particular parallel track as well as during the playing of a parallel track. The downloading of video data in parallel tracks can be achieved in accordance with smart downloading techniques such as those described in U.S. Pat. No. 8,600,220, issued on Dec. 3, 2013, and entitled "Systems and Methods for Loading More than One Video Content at a Time," the entirety of which is incorporated by reference herein.

Upon reaching a segment of the video presentation that includes parallel tracks, the application 112 makes a determination of which track to play. The determination can be based on, for example, an interaction made or option selected by the user during a previous video segment, during a previous playback of a pre-recorded video presentation, prior to playing the video, and so on. Based on this determination, the current track either continues to play or the application 112 switches to a parallel track.

In some implementations, multiple users can view a media presentation simultaneously. For example, several users on different user devices can view a parallel track multimedia presentation in synchronization, and each user can have a unique experience by switching between tracks (e.g., content representing different plots, points of view, people, locations, commercials, etc.) at different times. In one example, three users (user 1, user 2, and user 3) view in sync a ten-minute media presentation that includes parallel tracks A, B, and C. Over the ten minutes, user 1 can view content from the tracks in the sequence B, A, B, C, B, A; while at the same time user 2 can view content from the tracks in the sequence A, C, B, A; while at the same time user 3 can view content only from track A. Ultimately, each user can simultaneously experience a presentation unique to them.

In other implementations, the media presentation takes the form of an interactive video based on a video tree, hierarchy, or other structure. Such interactive video structures are described in U.S. patent application Ser. No. 14/978,491, filed on Dec. 22, 2015, and entitled "Seamless Transitions in Large-Scale Video," the entirety of which is incorporated by reference herein.

Figure 2:
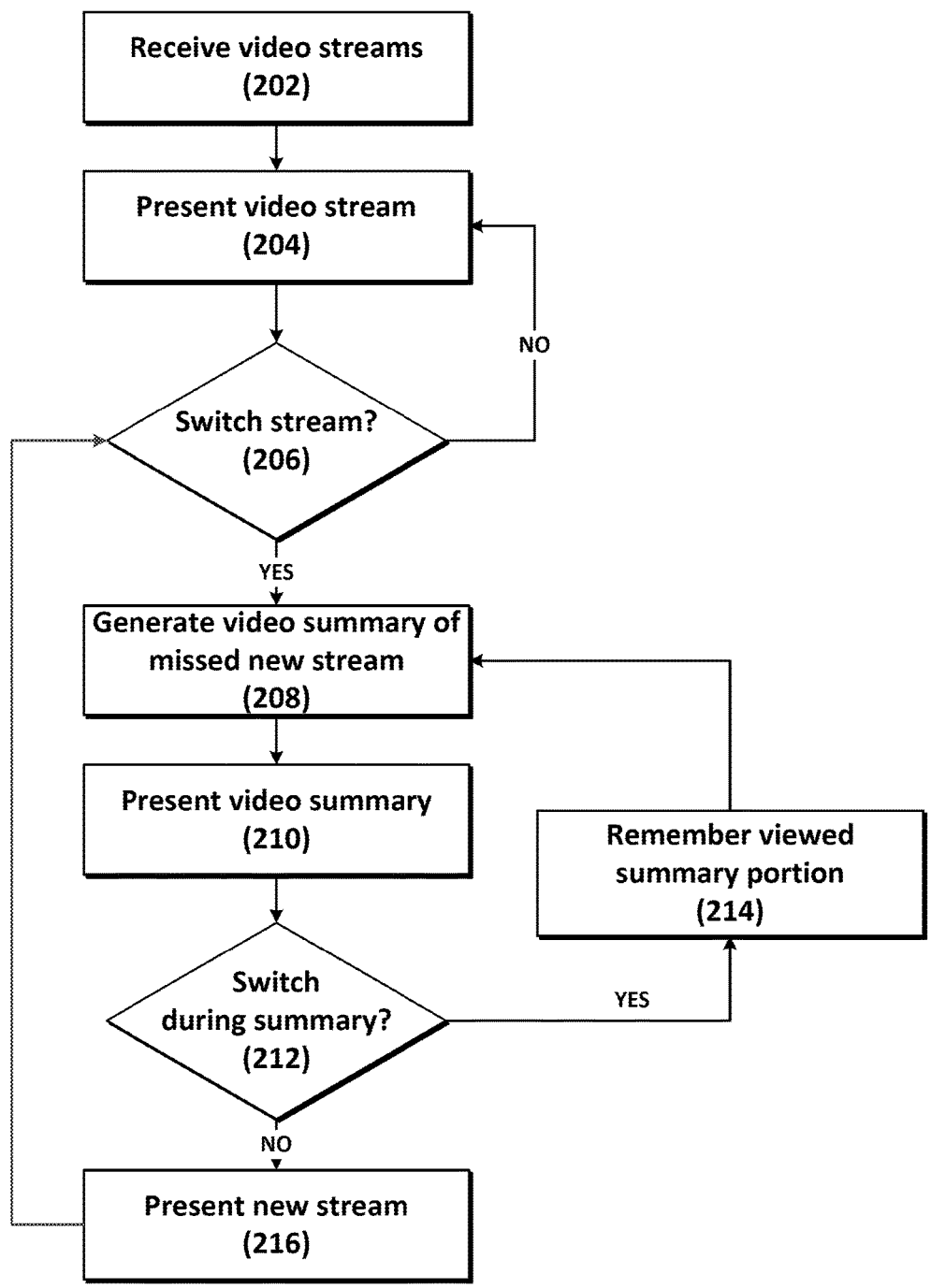
FIG. 2 depicts an example method for dynamically generating a video summary.

FIG. 2 depicts one implementation of a method for dynamic summary generation of media content. In STEP 202, multiple tracks or media streams (e.g., audiovisual content) are received in parallel by application 112. As described above, the streams can be parallel tracks that are synchronized to a common playback timeline. One of the streams (e.g., selected by the user or automatically) is presented to the user (STEP 204). The stream being presented can be visible to the user, while other parallel streams, though continuing to proceed according to the common timeline, are hidden/not heard. During playback of the currently viewed stream, application 112 can determine that the stream should be switched to a different parallel stream (STEP 206). The determination can be based on, for example, receiving an interaction or instruction from the user viewing the stream (e.g., interacting with the interface of the application 112 or content in the stream itself in order to make a selection resulting in the switch), or can be an automatic switch made by application 112 (e.g., at a predefined switchover time).

In STEP 208, a video summary is generated of content previously missed by the user in the new stream being switched to. Thus, for example, if the user had viewed Stream A between time 0 and time 10, and switched to Stream B at time 10, the generated summary would include Stream B content that had occurred between time 0 and time 10. The video summary can be generated on the client side or server side, for example, by application 112 and/or application server 106. To provide a seamless presentation, the video summary can be generated prior to a switch occurring. For example, video summaries of streams not being viewed can be proactively generated, with the expectation that the user may switch to one of those streams. The video summary further can be generated while one or more streams is being downloaded. In another implementation, the video summary can be generated in part or in full after the instruction for the switch is received. To increase responsiveness, a starting portion of the video summary can be generated and presented to the user and, while the summary is being presented, the remainder of the summary can be generated in real time. The generated summary is then presented in part or in full to the user (STEP 210) prior to switching to the new stream. In some implementations, the user can disable summary generation, and proceed directly to the switched-to track without interruption.

In some implementations, the user can switch back to the previously viewed stream (e.g., Stream A) or another stream (e.g., Stream C) while the video summary (e.g., of Stream B) is being presented (STEP 212). As will be described further below, this results in the need to track the portions of the summary that have been viewed or not viewed (STEP 214) so that, if the user returns to that stream (e.g., Stream B), the newly generated summary will include the summarized content that the user missed by switching from the previous summary prior to the completion of its presentation. If, on the other hand, the video summary plays in full, the switched-to stream (e.g., Stream B) then begins to be presented to the user (STEP 216). The process continues when the stream is next switched, if at all (return to STEP 206). When the presentation ends (or, in some instances, at any point in the presentation), the user can be provided with an opportunity to view summaries for some or all missed content.

Figure 3:
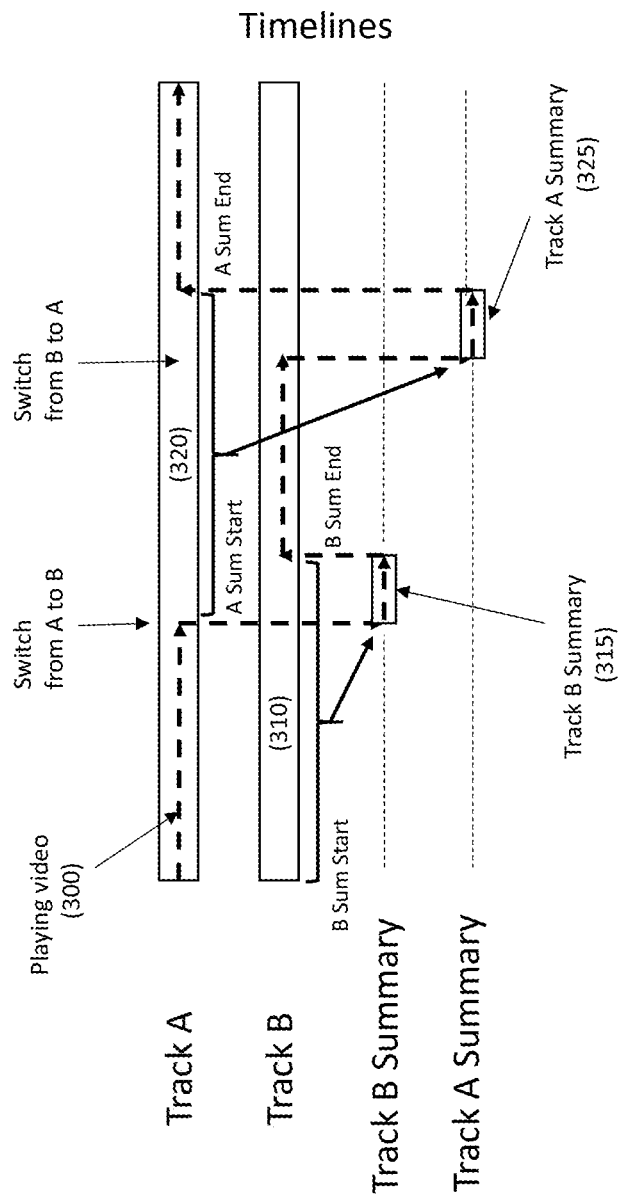
FIG. 3 depicts an example summary generation over the timeline of a parallel track media presentation.

FIG. 3 depicts an example parallel track video having two streams, Track A and Track B, each synchronized to a common timeline. For convenience, the common timeline is depicted as four timelines, representing the visible playback of video 300 as it transitions among video content from Track A, Track B, Track A Summary, and Track B Summary. In general, when generating a video summary for a particular stream, the summary covers the content occurring between the time when the user last viewed the stream (or the beginning of the stream, if it has not yet been viewed) and the time when the particular stream will start being presented to the user. The summary can have a minimum and/or maximum length of time. Of note, when the user switches to a different stream and a video summary is shown, the video summary overlaps content in the stream that would have been presented had the switch been immediate. Thus, in some implementations, the summary covers content in this overlapping portion as well. This situation is depicted in FIG. 3, where Track B summary 315 includes content 310 between B Sum Start (the starting time in Track B of content not seen by the user) and B Sum End (the time at which the Track B summary 315 will end).

In further detail, FIG. 3 depicts video content in Track A being viewed by the user from the beginning of the timeline to the point in time labeled "Switch from A to B," at which point there is an intent to switch from viewing Track A to viewing Track B. At that time, then, the playing video 300 transitions to a video summary of unseen content 310 from Track B (Track B summary 315), which includes the content that occurred while the user was watching Track A, as well as content in Track B that will occur while the Track B summary 315 is being shown. The length of the video summary 315 can be determined by, for example, identifying and adding up the length of individual portions of the summary 315 that will be compiled into the full summary 315 for presentation to the user. In the event that more time is allocated to the summary than is needed, idle videos (discussed further below) or other filler can be included in the summary.

Following the completion of playback of Track B summary 315, the playing video 300 transitions to Track B. The time that Track B summary 315 is presented to the user is also time during which Track A is not viewed. Accordingly, upon the user switching back to Track A, the video summary (Track A Summary 325) created for Track A includes content 320 from A Sum Start to A Sum End, which includes content occurring in Track A during playback of Track B summary 315, content occurring while presenting Track B, and content occurring while the user views Track A summary 325. Then, following presentation of Track A summary 325, the playing video 300 continues with presentation of Track A.

Various techniques for generating a summary are contemplated. In one implementation, the generation of a video summary is fully automated. In this instance, the summary of missed video content can include a version of the missed content presented at an increased speed (i.e., visibly fast-forwarded at 1.5×, 2×, 3×, or some other multiplier). The playback multiplier that is applied to the missed content can be constant or can vary (e.g., slower during more interesting parts). In one implementation, the playback multiplier is calculated to be a value that results in the summary being a particular length (e.g., a multiplier of 5× can be used to condense a 10-second video segment to 2 seconds). In another instance, the video summary includes individual static images from the missed content (e.g., individual frames or screenshots). The images selected can be random or predefined (e.g., designated by the video content creator), and there can be a random or fixed number of images selected per time period. The length of time between pictures and the length of time a picture stays on screen, as well as the minimum and/or maximum length of the summary itself, can be set by a content creator or content provider, or can be configurable within the video player.

In another implementation, the generation of a video summary is semi-automated. More specifically, interesting or important portions (e.g., still images, video clips, events, scenes, etc.) of the video content can be designated in advance by a content creator or other party. Then, when the video summary is generated, some or all of the designated portions are automatically compiled together for presentation to the user.

In a further implementation, video summary generation involves a more manual process, in which a specific summary is pre-constructed for each portion of a video stream. In one instance, for example, each video stream is divided into units referred to as "segments." When the content for the video stream is created or compiled by a content creator, editor, or other third party, a separate summary video can also be provided and associated with each segment in the stream (or some of the segments). Thus, for example, a 30-second video segment can have an associated 3-second summary. Then, if missed content includes all or a portion of that 30-second segment, the corresponding segment summary can be included in the full video summary generated for the missed content. If the missed content includes multiple segments, multiple corresponding segment summaries can be combined together for the full summary.

In some implementations, one or more segments also include a respective idle video that can serve as filler content. An idle video can include predefined video content showing a loop or other content in which nothing significant occurs. The idle content can be related to content in the segment. For example, if the segment includes video of a soldier in a battle, the idle content can depict the soldier taking cover behind a wall and breathing heavily for a period of time. Idle videos are useful where stream playback begins at segment boundaries with segments of fixed (though not necessarily equal) lengths. When a switch between streams occurs and a video summary is generated and presented, the summary may be of a length such that its end does not correspond with the end of a segment. In other words, the summary ends before the beginning of the next segment. In this instance, an idle video can be used to pad the length of the video summary (repetitively, if needed) such that the video stream commences with the start of the next segment directly after completion of the video summary. In other implementations, if the presentation of a summary will result in only a small intrusion into the next segment (e.g., less than 3 seconds), rather than padding the summary with idle content, the summary can nonetheless be shown, and the user will miss a small portion of the beginning of that segment's content.

For audio content in a video summary, a predetermined or random selection of audio can be provided (e.g., background music, narration, dialogue or sound effects, etc.). In the case of manually generated summaries, the segment summary can include a prerecorded audio track. In other implementations, the audio for a particular portion of the summary is the same audio associated with the corresponding content in the full version of the content.

Figure 4A:
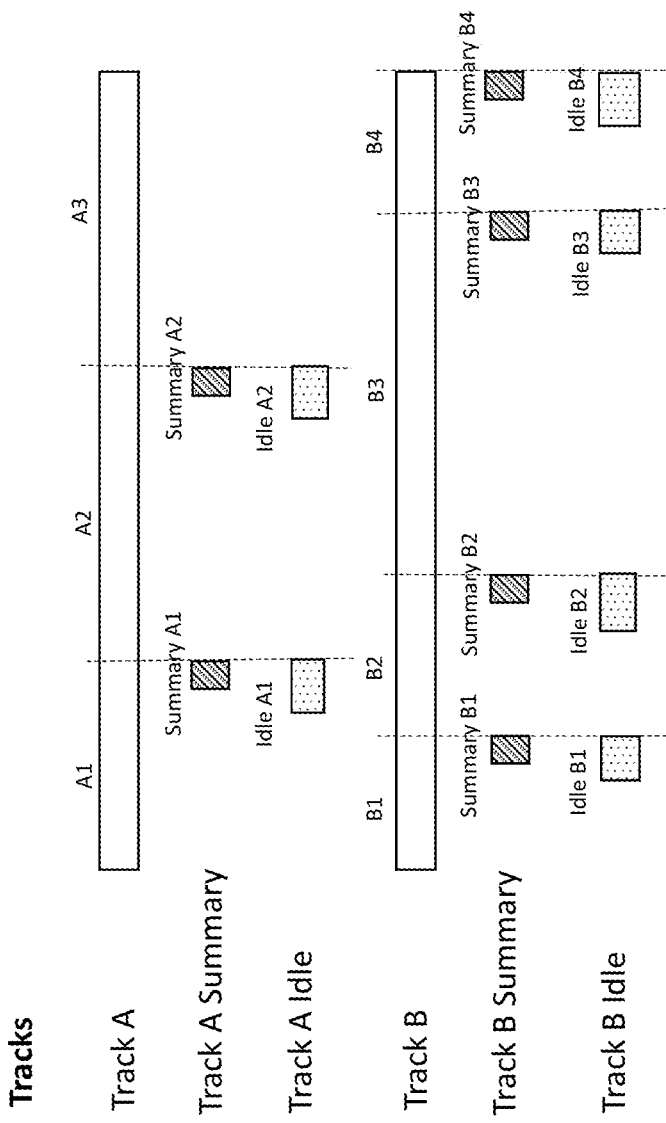
FIG. 4A depicts example segments and associated summary and idle content in a parallel track media presentation.

FIG. 4A depicts a video presentation with two parallel tracks, Track A and Track B. Track A includes three segments: A1, A2, and A3; and Track B includes four segments: B1, B2, B3, and B4. Each segment, except for A3, has associated, predefined summary and idle content. As depicted, summary A1 and idle A1 are associated with segment A1; summary B2 and idle B2 are associated with segment B2; and so on. In one example, segment A1 is a two-minute audiovisual presentation of a couple sitting at a table in a restaurant and having a conversation. In this case, summary A1 is a ten-second video clip highlighting the important parts of the discussion, and idle A1 depicts the couple eating without talking for one minute. As another example, segment B3 is a five-minute audiovisual presentation of a man walking down a crowded street, meeting and talking with various people. In this case, summary B3 includes twenty seconds of the man's encounters with notable persons and other interesting events, and idle B3 depicts the man continuously walking without speaking.

Figure 4B:
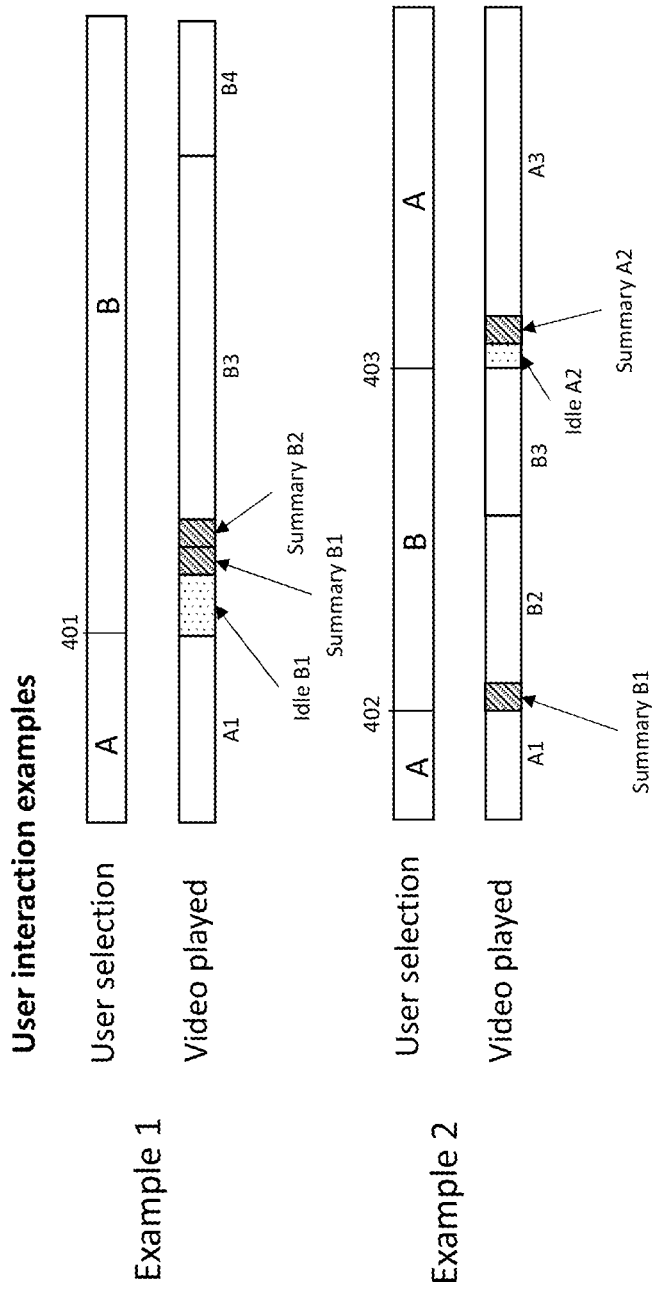
FIG. 4B depicts an example summary generation for the presentation of FIG. 4A.

FIG. 4B depicts two examples of a user watching the video presentation of FIG. 4A and switching between Tracks A and B at different times during playback. In Example 1, playback begins with Track A as the selected stream and, thus, segment A1 is played first. At time 401, the end of segment A1, a user selection implicates Track B, and playback begins to switch to Track B. As shown in FIG. 4A, segment A1 plays for the entire length of segment B1, as well as part of segment B2. At time 401, the next segment start in Track B is segment B3; however, summary B1 and summary B2 combined are not long enough to reach the start of segment B3. Accordingly, to maintain a smooth experience for the user without having gaps in playback, idle content (in this instance, idle B1) is included in the Track B combined summary (in this instance, the beginning of the Track B combined summary) as filler so that the remaining time in segment B2 is filled and segment B3 begins directly after conclusion of the Track B summary.

Example 2 in FIG. 4B begins with the presentation of segment A1. At time 402, prior to the completion of segment A1, a user selection implicates Track B. As segment B2 has not yet been reached, summary B1 is all that is shown prior to continuing playback on Track B. In this instance, there is minimal empty space between time 402 and the beginning of segment B2 after inserting summary B1 (e.g., <1.5 sec), so it is not necessary to include idle content. Playback on Track B continues through segments B2 and B3 until time 403, at which point a user selection implicates a return to Track A. When time 403 is reached, the user has missed a portion of segment A1 (from switching tracks prior to its completion) and a majority of segment A2. In this instance, because a large enough portion of segment A1 (e.g., >80%) was already seen by the user, no summary is shown for that segment. On the other hand, because a large enough portion of segment A2 (e.g., >80%) was not seen, summary A2 is shown before switching to Track A. In considering the portion of a segment that must have been seen or not seen, consideration can also be given to the time taken up by any summary that will be shown instead of segment content. Here, there is also sufficient time prior to the beginning of segment A3 to include idle content A2.

In some implementations, the present system intelligently determines whether a switch to a different stream should result in a summary being generated and shown for a particular portion of content. In general, the system can track whether a particular segment or portion of content was presented to a user, and use this status as an initial threshold for determining whether the segment or content portion is eligible to be included in a summary. For example, the system can consider only missed content (i.e., content that was played on a parallel track not visible to the user while the user was watching a different track) to be eligible for inclusion.

In one implementation, whether missed content is included in a summary can depend on how recently the user was viewing the stream (e.g., don't generate a summary for missed content on Track A if the user was previously viewing Track A within the last 10 seconds, or other threshold value). Another factor can be the amount of time the user has spent viewing a stream over a particular time period or running window (e.g., don't generate a summary for missed content on Track A if the user has spent at least four minutes out of the last five minutes viewing content on Track A). Yet another factor, useful in semi-automated summary generation systems, as described above, is whether the user has been presented with a threshold amount of designated interesting or important scenes or events in the content (e.g., don't generate a summary for missed content on Track A if the user has seen at least 80% of the important events in the missed content; generate a summary for missed content on Track B if the user has missed more than 20 seconds of designated important scenes in the missed content). For a manual summary generation system, for example, the summary for a particular segment can be shown to the user if at least a threshold amount of the segment was missed (e.g., show segment summary if more than 40%, 50%, 60%, or other amount of the segment was missed).

In some implementations, the system supports switching to another stream while the video summary is being presented and prior to the video summary being completed. In such circumstances, the system tracks which parts of the summary were viewed, determines the content in the switched-to stream corresponding to the viewed summary portions, and ensures that the corresponding content will be summarized and included in the summary the next time the user switches to that stream, if at all. In one implementation, for fully- and semi-automated systems, the point in time at which the user stops viewing the summary is correlated to a point in time in the corresponding content in the switched-to stream. Then, if the user returns again to that stream, the generated summary can include missed content starting from that point in time in the stream and going forward. In another implementation, for manual systems, if a user views more than a threshold amount (e.g., 50%, 60%, 70%, 80%, 90%, etc.) of a segment summary associated with a particular segment, then that segment is considered viewed and need not be summarized if the user returns to the switched-to stream. If, on the other hand, the user's viewing of the segment summary does not meet the threshold amount, the segment summary will be included in the summary the next time the user returns to the switched-to stream. In such a case, the segment summary can be restarted or shown from the point where the user left off.

FIGS. 5A-5D depict a graphical example of how the present system, in one implementation, addresses a stream switch during presentation of a summary. The figures show a two-track video presentation synchronized to a common timeline which, for convenience, is depicted as four corresponding timelines. Track A timeline 502 represents content in stream A over the common timeline. Likewise, Track B timeline 504 represents content in stream B over the common timeline. Summary timeline 512 represents content in Track A that will be summarized upon the user switching to Track A, and summary timeline 514 represents content in Track B that will be summarized upon the user switching to Track B.

Figure 5A:
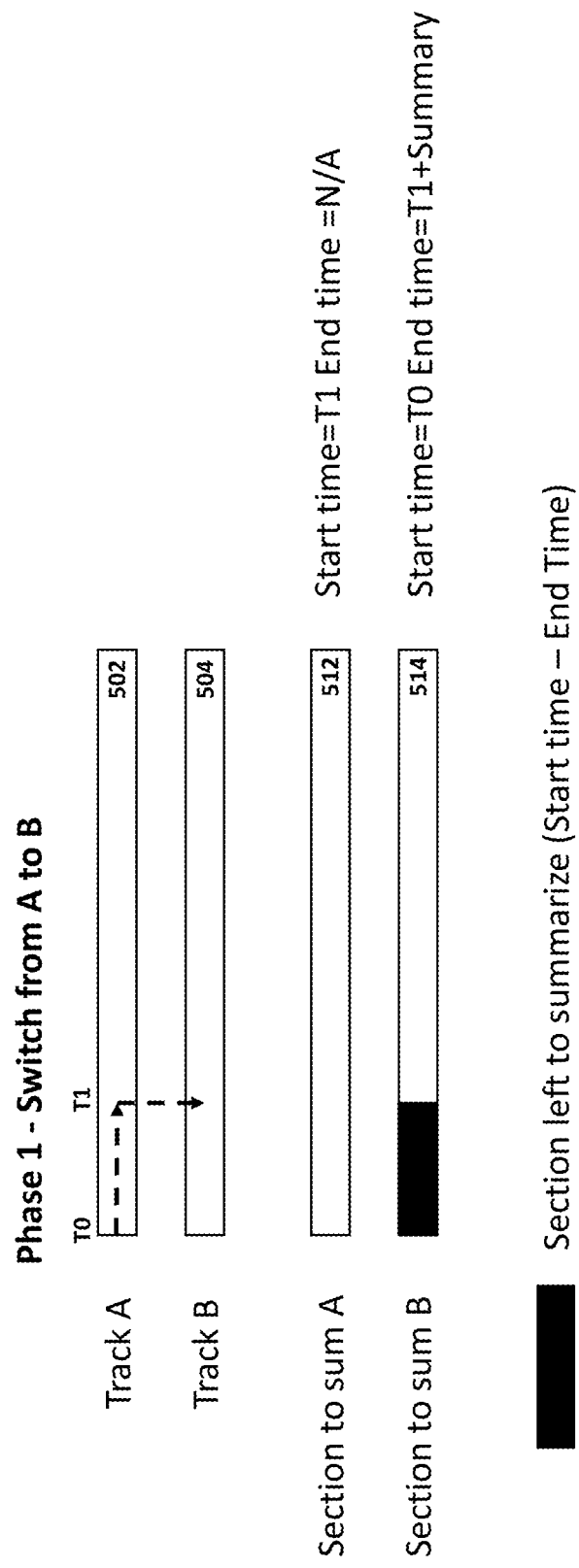
FIGS. 5A-5D depict an example summary generation when switching tracks during presentation of a summary.

FIG. 5A illustrates playing video (represented as a dashed line) that is being presented to a user. The Track A video is shown to the user between T0 and T1 on Track A timeline 502 (note that the video progresses according to the common timeline on Track B as well, however, that content is hidden to the user), at which point, at T1, a switch is made to Track B. As shown in summary timeline 514, the user missed content occurring on Track B between T0 and T1 and, accordingly, this is the content to be summarized. Further, because the user is switching away from Track A at T1, the content on Track 1 following T1 can be marked for summarization until the user returns to Track A.

Figure 5B:
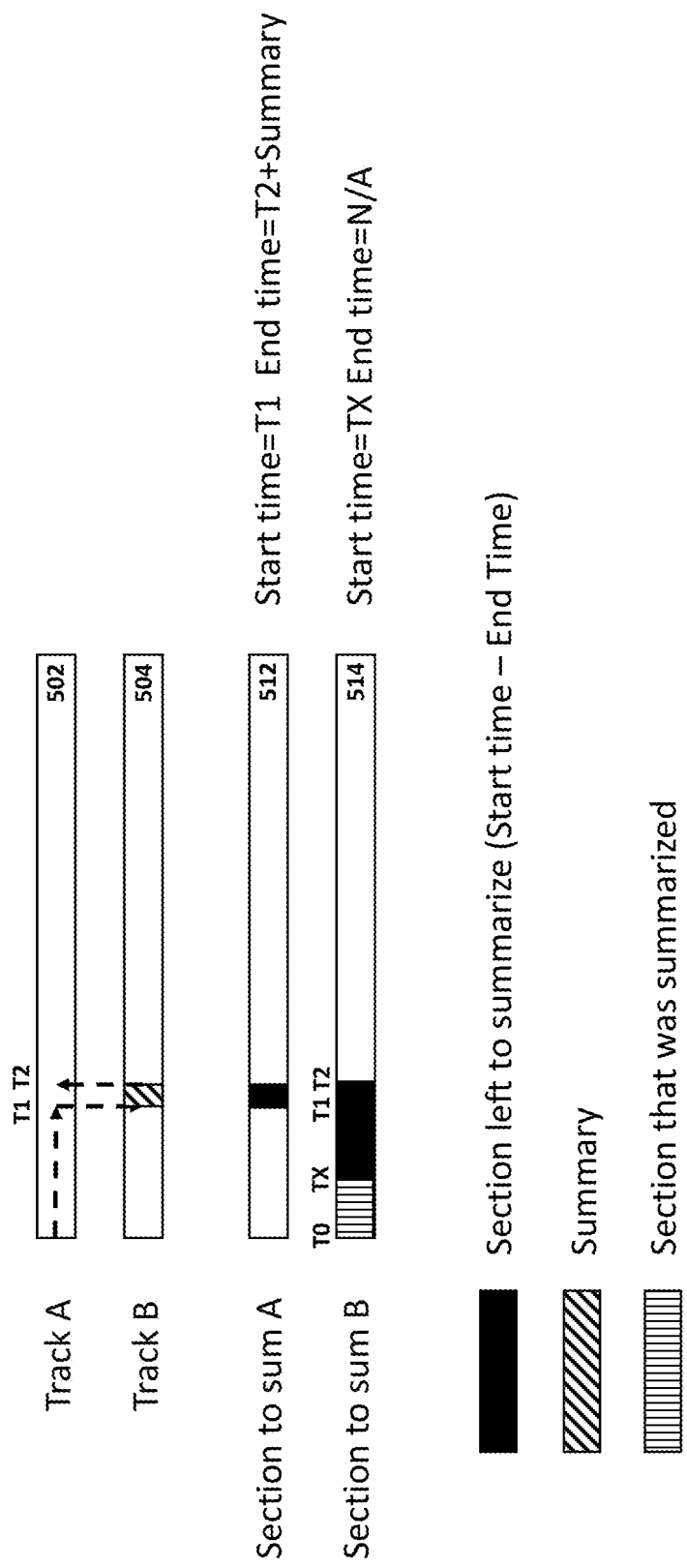

In FIG. 5B, while the summary of Track B content is being presented during T1 and T2, the user switches back to Track A, at time T2, before the summary finishes. Accordingly, summary timeline 514 shows that only a portion of the missed Track B content (T0 to TX) was summarized and viewed by the user, with content between TX and T1 yet to be presented in a summary to the user. Further, in viewing the summary between T1 and T2, more Track B content was missed and, thus, the Track B content between T1 and T2 can be summarized as well. Similarly, while the user was watching the Track B summary, the user missed Track A content between T1 and T2, causing Track A content between T1 and T2 to be marked for summarization as well (as shown in summary timeline 512).

Figure 5C:
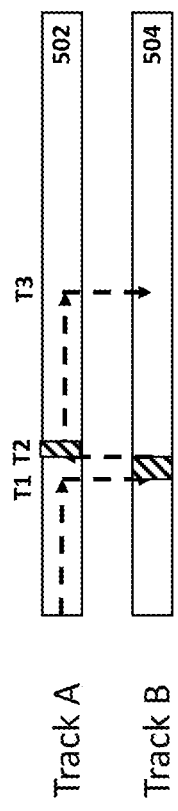
Figure 5C:
Figure 5C:
Figure 5C:
Figure 5C:
Figure 5C:

FIG. 5C shows a switch back to Track B, at time T3, after the user has viewed further content in Track A. As shown previously in FIG. 5B, Track A had missed content between T1 and T2 not yet provided in a summary to the user. Track A timeline 502 in FIG. 5C shows that, on switching to Track A at T2, the missed Track A content is summarized and presented to the user, and there is no further missed Track A content to summarize. During the time that the user is viewing the Track A summary, and before the switch back to Track B (i.e., between Time T2 and T3), further missed Track B content has built up (as shown in summary timeline 514) and can be summarized on the return to Track B at T3.

Figure 5D:
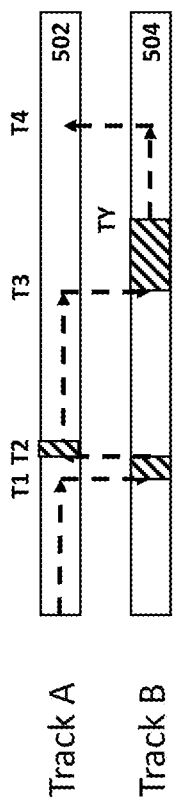

FIG. 5D depicts a further switch back to Track A, at time T4, after viewing the Track B summary between T3 and TY, and further Track B content between TY and T4. Here, because the entire remaining Track B summary was able to be shown before the user switched from the track, there is no further Track B content to summarize, as shown by summary timeline 514. Further, as sufficient time was available, the summary was able to include content missed in real-time on Track B, between T3 and TY, as the user viewed the summary. On the other hand, between T3 and T4, the user missed content on Track A and, as shown by summary timeline 512, that missed content can be summarized and presented on the user's return to Track A at T4.

In one implementation, visual, audio, haptic, or other indicators are provided to the user to inform that user that something interesting or otherwise notable has happened, is happening, or will happen on a track not currently being viewed by the user. Such indicators can include, but are not limited to, sound clips, graphics, video or audio thumbnails from the interesting content, and the like. In some instances, a numerical indicator is used to inform the user of the number of scenes (interesting or otherwise) missed on each track. In other instances, an indicator can include other information about missed content, such as the length of time of missed content, level of importance, category, and so on. The foregoing indicators can be, for example, shown in a video player interface, overlaid on the video itself, and/or displayed on a player progress bar.

Figure 6:
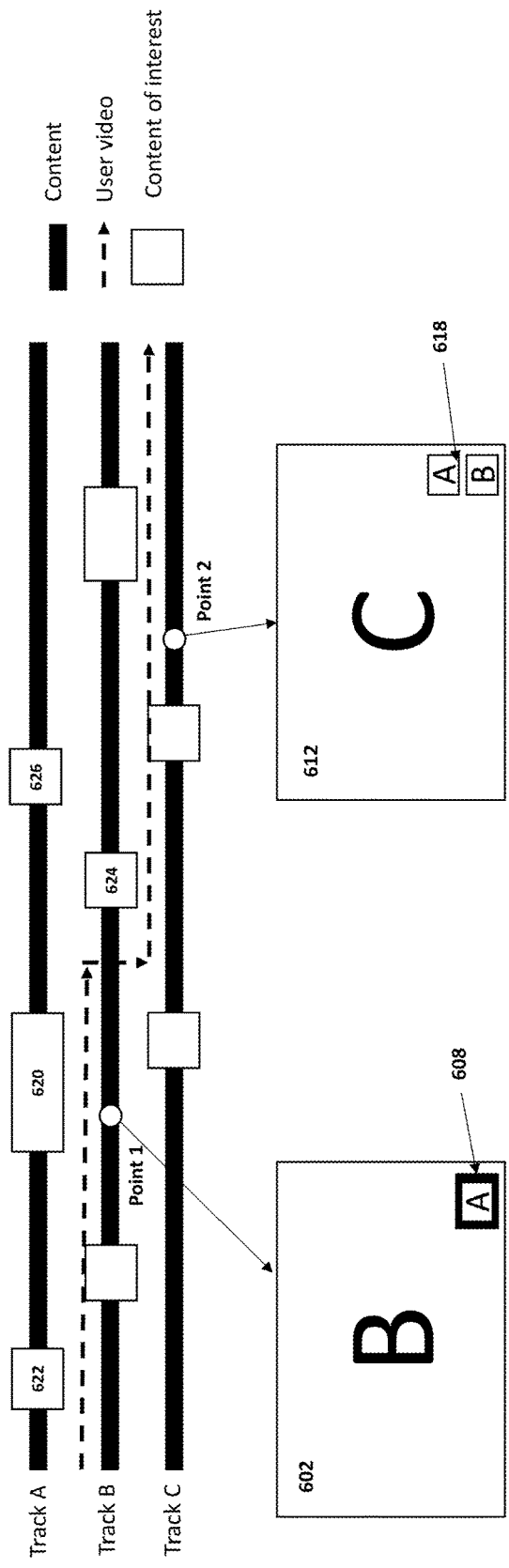
FIG. 6 depicts example visual indicators of interesting events on different tracks.

FIG. 6 depicts a parallel video presentation including Tracks A, B, and C. The dashed line represents the video seen by the user during the presentation as he views content on Track B and switches to Track C about halfway though. At Point 1 in Track B, video display window 602 includes graphical indicator 608 overlaid on the presentation. Graphical indicator 608 notifies the user that interesting content 620 is currently occurring in Track A. If desired, the user can switch to Track A and view the interesting content as it occurs. At Point B in Track C, video display window 612 shows graphical indicators 618, which indicate to the user that he missed interesting content 624 on Track B and interesting content 620, 622, and 626 on Track A. If the user then switches at Point 2 to Track A, he can see a summary of the three missed pieces of interesting content 620, 622, and 626. Likewise, if he switches at Point 2 to Track B, he can see a summary of interesting content 624. In some implementations, a numerical indicator is included in graphical indicators 618, which shows the number of interesting scenes missed.

One will appreciate the near-limitless number of applications of the techniques described herein. As one illustrative example, a video presentation includes a story about two girls, each with a different camera following her. A user can switch from one following camera to the other by switching between tracks. When a switch is made from one girl to another, a summary of events that happened to that girl from the previous time that the user saw her can be shown, prior to switching to that girl's camera. In another example, a video presentation includes three soccer games being broadcast in parallel (live or prerecorded). Upon the user switching to a different match (different stream), a highlight summary of the match is dynamically generated and shown to the user based on what the user missed in that match.

Although the systems and methods described herein relate primarily to audio and video presentation, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
simultaneously receiving a plurality of video streams, wherein each of the video streams is synchronized to a common playback timeline;
presenting a first one of the video streams to a user between a first time in the playback timeline and a second, later time in the playback timeline;
receiving an instruction to switch to presentation of a second one of the video streams;
generating a video summary of the second video stream based on content in the second video stream occurring between the first time and the second time; and
presenting at least a portion of the video summary to the user prior to switching to the presentation of the second video stream, wherein the video summary is presented to the user between the second time and a third, later time in the playback timeline, and wherein the generating of the video summary is further based on content in the second video stream occurring between the second time and the third time, such that the video summary includes a summary of content in the second video stream that the user will miss during watching the video summary.

2. The method of claim 1, wherein each video stream comprises content related to the other video streams.

3. The method of claim 1, wherein the video summary comprises content not previously viewed by the user.

4. The method of claim 1, wherein the video summary comprises at least one of (i) video content from the second video stream presented at an increased playback speed and (ii) a selection of still images of video content in the second video stream.

5. The method of claim 1, wherein the video summary comprises content from the second video stream previously designated as important.

6. The method of claim 1, wherein each video stream comprises a plurality of segments, each segment comprising a segment summary video and a segment idle video.

7. The method of claim 6, wherein the generating of the video summary comprises including in the video summary at least one segment summary video from one or more segments occurring at least in part between the first time and the second time.

8. The method of claim 6, wherein the generating of the video summary comprises including in the video summary at least one segment idle video from one or more segments occurring at least in part between the first time and the second time.

9. The method of claim 1, further comprising:
switching back to presentation of the first video stream while the video summary is playing;
identifying content in the second video stream corresponding to a portion of the video summary not viewed by the user; and
including a summary of at least some of the identified content in a second video summary generated for presentation to the user when next switching to the second video stream.

10. The method of claim 1, further comprising providing an indicator informing the user when an interesting event is occurring or has occurred on a video stream not currently being viewed by the user.

11. A system comprising:
at least one memory for storing computer-executable instructions; and
at least one processor for executing the instructions stored on the memory, wherein execution of the instructions programs the at least one processor to perform operations comprising:
simultaneously receiving a plurality of video streams, wherein each of the video streams is synchronized to a common playback timeline;
presenting a first one of the video streams to a user between a first time in the playback timeline and a second, later time in the playback timeline;
receiving an instruction to switch to presentation of a second one of the video streams;
generating a video summary of the second video stream based on content in the second video stream occurring between the first time and the second time; and
presenting at least a portion of the video summary to the user prior to switching to the presentation of the second video stream, wherein the video summary is presented to the user between the second time and a third, later time in the playback timeline, and wherein the generating of the video summary is further based on content in the second video stream occurring between the second time and the third time, such that the video summary includes a summary of content in the second video stream that the user will miss during watching the video summary.

12. The system of claim 11, wherein each video stream comprises content related to the other video streams.

13. The system of claim 11, wherein the video summary comprises content not previously viewed by the user.

14. The system of claim 11, wherein the video summary comprises at least one of (i) video content from the second video stream presented at an increased playback speed and (ii) a selection of still images of video content in the second video stream.

15. The system of claim 11, wherein the video summary comprises content from the second video stream previously designated as important.

16. The system of claim 11, wherein each video stream comprises a plurality of segments, each segment comprising a segment summary video and a segment idle video.

17. The system of claim 16, wherein the generating of the video summary comprises including in the video summary at least one segment summary video from one or more segments occurring at least in part between the first time and the second time.

18. The system of claim 16, wherein the generating of the video summary comprises including in the video summary at least one segment idle video from one or more segments occurring at least in part between the first time and the second time.

19. The system of claim 11, wherein the operations further comprise:
switching back to presentation of the first video stream while the video summary is playing;
identifying content in the second video stream corresponding to a portion of the video summary not viewed by the user; and
including a summary of at least some of the identified content in a second video summary generated for presentation to the user when next switching to the second video stream.

20. The system of claim 11, wherein the operations further comprise providing an indicator informing the user when an interesting event is occurring or has occurred on a video stream not currently being viewed by the user.

* * * * *